June 12, 1956  F. C. ARMISTEAD  2,750,514
CONTAINER FOR SCINTILLATION LUMINOPHOR
Filed June 17, 1952

INVENTOR.
FONTAINE C. ARMISTEAD
BY
J. A. Grahame
ATTORNEY

United States Patent Office 2,750,514
Patented June 12, 1956

2,750,514

CONTAINER FOR SCINTILLATION LUMINOPHOR

Fontaine C. Armistead, Marblehead, Mass., assignor to Texaco Development Corporation, New York, N. Y., a corporation of Delaware Application June 17, 1952, Serial No. 294,000

4 Claims. (Cl. 250—71)

This invention relates to the detection and measurement of radiation such as alpha particles, gamma rays, neutrons, and the like, and more particularly to a luminophor element for such purposes.

The invention broadly contemplates detection and measurement of radiation with detection means employing a fluid luminophor, for example, a liquid luminophor such as a solution of p-terphenyl in xylene, wherein the fluid luminophor is placed within a container at least part of which is a translucent, compliant membrane.

Certain substances, such as crystalline anthracene or sodium iodide, and liquids such as naphthalene or terphenyl dissolved in xylene, have been found to possess the property of converting radiation such as alpha particles and gamma rays into radiation in the ultraviolet or visible light range. Such substances are called luminophors and their utilization in the detection of such radiation has been practiced to some extent. In the simpler arrangements the luminophor is subjected to radiation and the converted radiation from the luminophor is detected and measured by a device, for example, an electron multiplier of the photo-tube type, sensitive to the converted radiation.

The efficiency of a radiation detecting device employing a luminophor depends upon many factors. Among the more important of these is the efficiency of transport of the secondary or converted radiation from the luminophor to the means provided to detect and measure it. Since the luminophors generally used at present convert radiation such as alpha particles and gamma rays into visible or ultraviolet light, the term "light" as used in the following will be understood to mean the converted radiation. The efficiency of transport of the light in turn depends on two main factors, the amount of light internally absorbed and reflected by the luminophor and the degree of optical coupling between the luminophor and the means sensitive to the light. The absorption and reflection of light by the luminophor is not within the domain of the invention and it is mentioned only to lend emphasis to the need for close optical coupling.

Methods have been devised to provide closer optical coupling or linkage between the luminophor and the means sensitive to the light emitted by the luminophor. For example, in radiation detectors employing photomultiplier tubes and glass or plastic envelopes as containers for the luminophor, a small amount of a liquid, for example, mineral oil, which has an index of refraction similar to that of the glass or plastic, is placed between the luminophor envelope and the photomultiplier tube envelope in order to remove air gaps between the two envelopes which are due to the mismatches of shape, curvature, etc., in the glass or plastic surfaces. The luminophor envelope may be shaped to correspond closely to the shape of the photomultiplier tube envelope in order to provide closer fit between the two envelopes and to gain a wider area of light transmission. It has also been proposed to surround the light detecting and measuring means, in particular photomultiplier tubes or photosensitive Geiger-Mueller tubes, with the luminophor.

One disadvantage of the methods described above is that the photosensitive device and the luminophor must be mounted adjacent one another with special care in order that the optical linking fluid will be retained between the proper surfaces. This complicates the construction of the radiation detector. Alternatively, one might use a cement with the proper optical properties, such as Canada balsam, to serve both as the optical link and as the structural element which holds the luminophor and photosensitive elements together. In addition to structural complications a packing gland for retaining the optical link fluid would make the disassembly of the luminophor and photosensitive element difficult and inconvenient, and the use of cement would have the same effect, only to a greater degree. The result would be that the radiation detector would be inconvenient to handle and to maintain, and disassembly of luminophor and photosensitive elements would be very difficult.

Another disadvantage of the above methods is that interchangeability of luminophor and photosensitive elements would be either impossible or possible only at a sacrifice of light collection efficiency. If, for example, a glass envelope to be used as a container for the luminophor, were carefully shaped to conform to a certain photomultiplier tube envelope so that the inter-envelope gaps would be reduced in size to a minimum, then upon changing photomultiplier tubes, one would generally find a poorer fit, since the tube envelopes, especially in the large sizes, cannot be manufactured to close dimensional tolerances. This misfit would result in a light-collection loss.

The desirability of this interchangeability feature will appear from such considerations as the following: with interchangeable units the same light-receiving means, again for example, a photomultiplier tube, and other apparatus required in the detector may be used at one time with a luminophor which detects say neutrons, at another time with a luminophor which detects gamma rays, etc.; or again, with interchangeable units either a new luminophor unit or a new photomultiplier tube could be easily substituted for a defective unit without at the same time having to sacrifice the good photomultiplier or luminophor unit to which the defective unit was coupled. This feature is especially important in field operations where the weight and bulk of spare parts must be kept to a minimum.

Such detachable units are known in the art, but these units are somewhat difficult to construct and the closeness of the optical coupling between such units and the photomultiplier tube is subject to the limitations discussed hereinbefore.

The present invention in overcoming the aforesaid disadvantages and in providing an improved luminophor element for use in detecting and measuring radiation comprises the use of a fluid luminophor, preferably a liquid such as p-terphenyl in xylene. The compliant, translucent part of the container, which may be formed of a thin plastic membrane such as cellophane, is placed against that external surface of a photomultiplier tube, or other light-measuring means, which is adjacent to its light-sensitive cathode (or member). Such a membrane will fit very closely to the photomultiplier tube surface, conforming in a great degree to the irregularities in the tube surface and will provide very close optical coupling between the luminophor and the photomultiplier tube. Optical link fluids may still be used to advantage between the two envelopes, and it is noteworthy that such fluids will be retained in place by capillarity due to the small size of the space and thus will require no special packing gland.

It is to be understood that the term "translucent" as employed herein includes the term "transparent," that is, the transmission of light as opposed to the term "opaque," and furthermore, the spectral range of translucency is always understood to be at least a substantial part of the spectral range of luminescence of the luminophor.

The luminophor unit of the invention (in which term is included its means of being optically coupled to the photosensitive device) is easily constructed and is easily detachable from the light receiving and other means required in the complete radiation detecting device. This ease of construction and detachability will be explained fully in the descripiton which follows.

Thus one advantage of the invention is the provision of an improved luminophor element for use in the detection of radiation wherein the optical link between the luminophor and the photosensitive device is self-shaping and compliant so that close optical coupling is automatically provided.

Another advantage of the invention resides in the fact that the improved luminophor is easily and cheaply constructed.

Another advantage of the invention arises from the fact that the improved luminophor element in combination with a light-sensitive means is easily handled and serviced.

A further advantage of the invention is the provision of an improved luminophor element for use in a detector of radiation which is quickly and easily detached from its place in the detecting apparatus and may be replaced by other similarly constructed luminophor elements.

A still further advantage of the invention is the provision of an improved luminophor element for use in a detector of radiation which is optically coupled to the light-sensitive unit in a manner that permits the light-sensitive unit to be quickly and easily detached from its place in the detecting apparatus and to be replaced by another light-sensitive unit.

Another advantage of the invention is the retentiveness of the space between luminophor and light-sensitive element envelopes for such fluids as may be introduced there as optical links, this retentiveness being the result of the capillary forces present in such small spaces, with the result that no provision need be made to retain such optical linking fluids.

These and further advantages of the invention will be explained in the following description and claims taken in conjunction with the attached drawings wherein:

Figure 1:
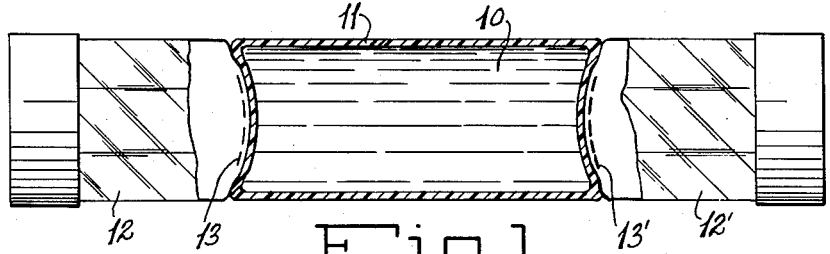
Figure 1 illustrates a form of the novel luminophor element used in conjunction with two end-window type photomultiplier tubes.

Referring to Figure 1, which illustrates a sectional view of one form of the invention, the numeral 10 refers to a liquid luminophor, such as p-terphenyl dissolved in xylene, contained in a compliant, translucent membrane 11. The luminophor unit, comprising the elements, container 11 and luminophor 10, is so disposed between two photomultiplier tubes 12 and 12' of the end-window type so that the luminophor unit fits closely to the surfaces of the tubes through which radiation reaches the cathodes 13 and 13' of the photomultiplier tubes. The three units, luminophor and two photomultiplier tubes, are arranged to fit as closely together as possible, an arrangement which is easily accomplished with the novel luminophor unit illustrated herein since it will readily conform to the surface of the photomultiplier tubes as shown in the figure. Although two photomultiplier tubes are depicted it is possible to use more than two in the arrangement as illustrated in this figure since end-window tubes may also be disposed, for example, so that their windows are adjacent to other sides of the luminophor unit.

Figure 2:
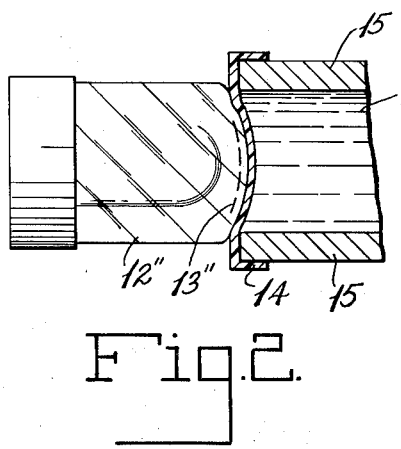
Figure 2 illustrates a section of the novel luminophor unit shown in conjunction with an end-window photomultiplier tube wherein the end of the luminophor unit adjacent the photomultiplier tube is comprised of a translucent, compliant membrane and the sides of the luminophor unit are composed of a rigid substance.

Figure 2 represents a section of a form of the novel luminophor unit wherein a liquid luminophor 10' is in a container having rigid walls 15. These walls 15 are composed of a substance permeable to the radiation which it is desired to detect. For example, glass, aluminum, Lucite, steel, etc., may be used, depending on the function of the radiation detector. A translucent, compliant membrane 14 is sealed to the walls 15, and the luminophor unit thus constructed is closely fitted to the window of a photomultiplier tube of the end-window type. The end wall of the luminophor element opposite the translucent, compliant membrane 14 may be composed of the same substance as the walls 15 if it is desired to use only one photomultiplier tube, or may be a membrane substantially identical to that illustrated by the numeral 14. If the latter is the case, this membrane may be placed adjacent to a second end-window photomultiplier tube. Furthermore, membranes similar to that designated by the numeral 14 may be disposed in openings constructed in the walls 15 thus permitting the use of more than two photomultiplier tubes.

Figure 3:
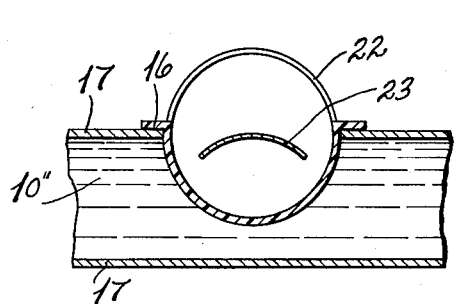
Figure 3 illustrates a section of a form of the novel luminophor unit used in conjunction with a photomultiplier tube of the side-window type.

A similar arrangement showing an adaptation of the novel luminophor unit for use with a side-window photomultiplier tube is illustrated by Figure 3. In this figure, which is a sectional representation, the numeral 10" represents a liquid luminophor in a container comprising side walls 17 and a translucent, compliant membrane 16. The photomultiplier tube 22 is so disposed that it fits closely to the surface of the tube through which radiation reaches the cathode 23. Since this arrangement may be modified in a manner similar to that described for the arrangement illustrated by Figure 2 no further description of the modification as illustrated by Figure 3 is deemed necessary.

Figure 4:
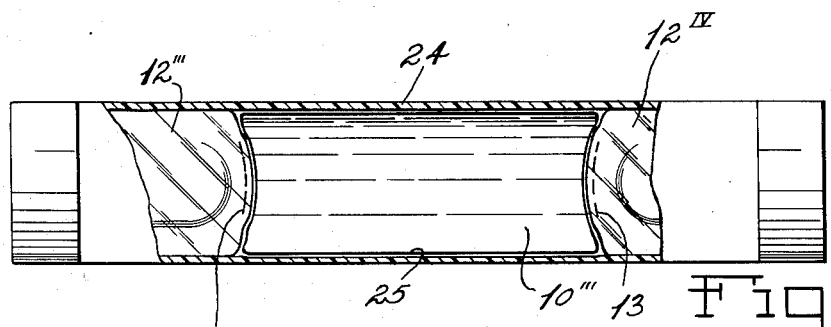
Figure 4 illustrates the use of a rigid support for a form of the novel luminophor unit wherein the container for the luminophor is composed entirely of a translucent, compliant membrane.

If the container for the luminophor consists wholly of a translucent, compliant membrane a support may be required for it. The support is constructed of a rigid material which is translucent to the radiation to be received by the luminophor. Lucite, and similar transparent plastics, is a preferred material for the support since it is translucent to most penetrative radiation such as gamma rays and neutrons, is less liable to damage than a more brittle material such as glass, and can be easily fabricated into desirable shapes. One such support is illustrated in Figure 4. The support consists of a tubular member, designated by the numeral 24, and is composed of a substance, for example, Lucite, which permits passage of penetrative radiation being measured. The application of this support is illustrated in the figure. The support 24, which has been made so that its inner diameter conforms to the outer diameters of the photomultiplier tubes 12''' and 12$^{IV}$ and of the luminophor container 25, is placed around the two tubes and the container, thus holding them rigidly together and giving support to the container 25. If it is desired to detect and measure less penetrating radiation, such as ultra-violet radiation or alpha particles, the support may be constructed as a framework with openings between the frame members through which the radiation may pass into the luminophor. Many other types of support may be used and that shown in Figure 4 is for illustrative purposes only.

Figures 5, 6:
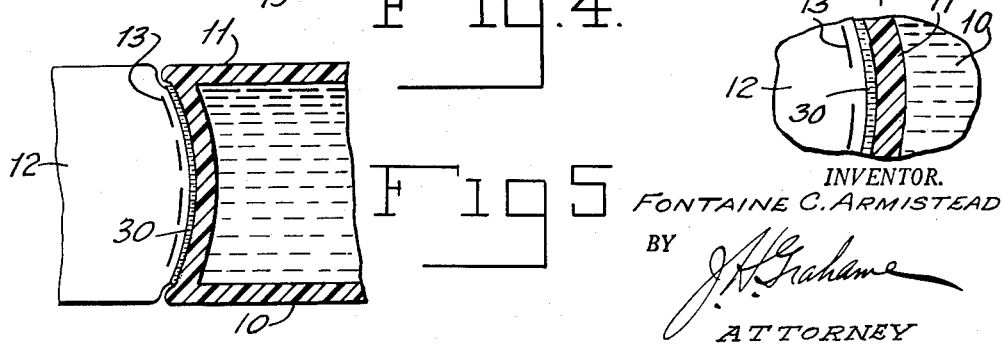
Figure 5 illustrates a section of a novel luminophor unit similar to that shown in Figure 1 wherein a fluid optical link is maintained between the photomultiplier tube and the translucent compliant membrane of the luminophor unit.
Figure 6 illustrates a magnified portion of the apparatus shown in Figure 5.

Referring now to Figure 5, there is shown an enlarged section of a detector unit similar to that of Figure 1 wherein similar reference units identify similar elements. In this embodiment, a transparent optical link fluid 30 is shown between the sensitive face of the photomultiplier tube 12 and the translucent membrane 11 containing the liquid luminophor 10. This optical linking fluid 30 is maintained in position through capillary forces due to the close contact permitted by the use of a compliant membrane.

The membrane which comprises the whole of the container for the luminophor or that portion of the container adjacent to the light-receiving member of the radiation detector, as described hereinbefore, is composed of a material which is translucent to light and physically compliant, and is preferably substantially less than a millimeter in thickness. A physically compliant membrane, as the term is applied herein, is one which, on the application of a small amount of pressure, fits and conforms very closely to a surface with which it is placed in contact. The material from which the membrane is formed must be chemically inert with respect to the luminophor used. That is, it must not dissolve in or react, either physically (for example, by stiffening) or chemically (for example, other than solution, by the formation of small quantities of impurities within the luminophor or by forming an opaque surface on the membrane) with the luminophor used. Several materials are known which have these properties. Examples of such materials are plastics such as cellophane, polyvinyl chloride, vinyl chloride-acetate copolymers, polyvinylidene chloride, and vinyl chloride-vinylidene chloride copolymers.

Although the novel luminophor unit of the invention has been described for use in a detector of radiation, it may be used in conjunction with other applications such as neutron or X-ray radiography, lighting devices, in ornamental designs, and other electronic apparatus requiring the use of a luminophor.

It is well to note that the novel luminophor unit is particularly suited for use in radiation detectors used in well logging where the detector must be of rugged construction. The provision of a luminophor container composed of a translucent, compliant membrane which is more resistant to damage than are more rigid materials such as glass is especially desirable in this application.

Obviously, many modifications and variations of the invention as hereinbefore set forth, may be made without departing from the spirit and scope thereof, and therefore, only such limitations should be imposed as are indicated in the appended claims.

I claim:
1. In a detector of penetrative radiation, the combination comprising a fluid luminophor, capable of converting said radiation into less penetrative radiation including light, confined within a container, a translucent compliant membrane forming at least a portion of the confining wall area of said container, photoelectric means responsive to said less penetrative radiation to produce an electrical effect, said photoelectric means having an optical input surface whose configuration is subject to variation from a predetermined standard, and said input surface being juxtaposed in physical contact to said membrane, said membrane providing an effective area of light transmission from the fluid to the photoelectric means.

2. The combination according to claim 1 in which the membrane is less than a millimeter in thickness and is chemically inert with respect to the luminophor substance.

3. The combination according to claim 1 in which the membrane is formed of a plastic substance selected from the group consisting of cellophane, polyvinyl chloride, a vinyl chloride-acetate copolymer, polyvinylidene chloride, and a vinyl chloride-vinylidene chloride copolymer.

4. A scintillometer comprising a quantity of a fluid luminescent material for converting penetrative radiation into light, a container for said fluid material having a window comprising translucent compliant membrane through which light produced within said material can be transmitted to the exterior of the container, a photoelectric device for receiving light from said material through said window to convert variations therein into electrical variations, said device having an optical input surface corresponding to an exterior surface of said window, and a film of an optical link fluid held captive between said corresponding surfaces by capillarity.

References Cited in the file of this patent
UNITED STATES PATENTS 2,550,106     Coltman et al. _____ Apr. 24, 1951
2,698,906     Reynolds et al. _____ Jan. 4, 1955

OTHER REFERENCES

"Scintillation Counting with Solutions," by Hartmut Kallmann, from Physical Review, vol. 78, 1950, pp. 621–622.

"Fluorescent Liquids for Scintillation Counters," by Kallman and Furst, from Nucleonics, March 1951, pp. 32–39.